May 24, 1938.  W. C. REA  2,118,524
ROCK DRILL
Filed Dec. 29, 1932
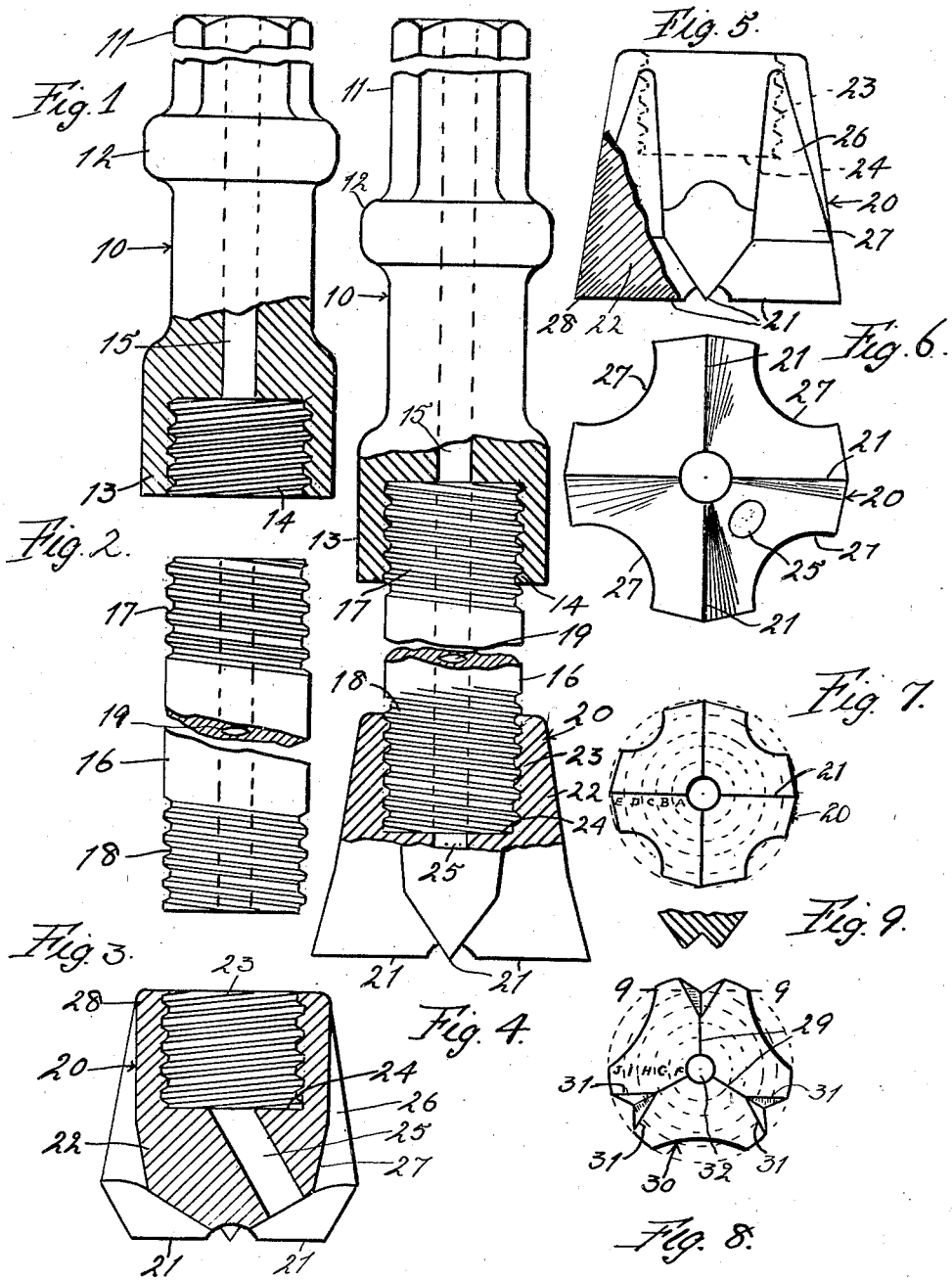
INVENTOR
Walter C. Rea
By W. W. Williamson
Atty.

Patented May 24, 1938

2,118,524

UNITED STATES PATENT OFFICE 2,118,524

ROCK DRILL

Walter C. Rea, Philadelphia, Pa., assignor, by mesne assignments, to Detachable Bit Company, New York, N. Y., a corporation of Delaware Application December 29, 1932, Serial No. 649,300

5 Claims. (Cl. 255—64)

My invention relates to new and useful improvements in rock drills and has for one of its objects the production of a removable drill bit from low carbon alloy steel. As will become apparent from the description herein, I am particularly interested in manufacturing removable drill bits from bar stock but in some instances they can be forged or cast. In any case, I contemplate the use of the low carbon alloy steel because it is cheaper to machine, forge and anneal, and because the strains set up during forging or machining do not in any way interfere with the hardening process.

Another object of the invention is to provide a case hardened or carburized removable drill bit.

Another object of this invention is to heat treat the parts in a unique manner to form a drill bit having a shank of one degree of hardness, a body of a greater degree of hardness and cutting elements of a still greater degree of hardness.

Another object of the present invention is to provide a new method of manufacturing drill bits wherein a section of bar stock is properly and suitably fashioned by the use of gear cutting and other automatic machinery.

Another object of my invention is to so construct the parts of the rock drill that a flat or square metal to metal contact between the bit, rod and shank is provided without change in cross section or reduction in area between the end of the rod and the body of the bit or the base of the socket in said bit as well as between the meeting ends of the rod and shank.

Another object of the invention is to so fashion the bit and shank as to make possible the use of round hollow drill rods made of standard steels which can be purchased in the open market thereby considerably reducing the initial cost of manufacture as well as the expenses of upkeep.

Another object of the invention is to provide a drill bit with a set of cutting edges extending radially from the axis of the bit to points short of the circumference of the bit where each cutting edge is developed into a pair of diverging cutting edges extending to the circumference of the bit. This arrangement provides a greater number of cutting edges or working elements in the locality where the greater amount of work is to be accomplished by the bit. Theoretically, the proper design of bits would be to have an increasing number of cutting edges in direct ratio to the diameter of the hole being bored. However, this would be impractical from the manufacturing standpoint and it will be seen that my construction most nearly approaches the proper design in a practical manner.

Another object of the invention is to provide a non-clogging hole in the drill bit by forming a short oblique hole from the base of the socket through the body of the bit to a surface of said body between contiguous cutting edges or elements.

Another object of the invention is to provide a removable drill bit having different degrees of hardness between the outside of the cutting end, the interior of the body and the socket end. This same feature is also carried out in the drill rod, and if desirable, also in the shank.

Another object of the invention is to provide a rock drill bit with hard wear resisting cutting edges and gauge clearance angles combined in one piece with a socket section of tough shock resisting qualities and therefore of less hardness than the cutting edges and the two different degrees of hardnesses blended without a sharp line of delineation providing an intermediate degree of hardness between the minimum and maximum hardnesses.

Another object of the invention is to provide wide threads of coarse pitch with shallow depth and flat angular sides which will give ample strength under loose tolerances, thereby providing plenty of contact surface which will securely hold the parts together and eliminate undue wear or distortion while permitting the parts to be easily separated.

Another object of the invention is to provide a drill bit including the cutters, body and socket in a one piece integral unit thereby eliminating all types of collars, springs, pins, wedges, cams and other intermediate means of connecting the cutting end of the bit with the socket.

A further object of the invention is to provide a rock drill wherein the disturbing or distressing counter or reflex power transmission waves may be broken up and to a large extent eliminated.

A still further object of the invention is to forge a one piece drill bit by a method which will eliminate the flash on the reaming edges and form such flash on the socket end where it may be readily removed.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a view partly in elevation and partly in section of a rock drill shank.

Fig. 2 is a side elevation of the drill rod.

Fig. 3 is a longitudinal sectional view of the one piece drill bit embodying the features of my invention.

Fig. 4 is a view partly in elevation and partly in section of the elements illustrated in Figs. 1, 2 and 3 joined together as they would be when in use.

Fig. 5 is a view partly in elevation and partly in section of a drill bit embodying the features of my invention and which view is taken at about forty-five degrees to the position of the one shown in Fig. 3.

Fig. 6 is an outer end view thereof.

Fig. 7 is a view similar to Fig. 6, on a reduced scale with circles thereon illustrating diagrammatically the area of material cut by various sections of the cutting edges of a drill of ordinary construction.

Fig. 8 is a similar view of a removable one piece drill bit of unique construction to illustrate an effective design of bit providing an increasing number of cutting edges near the outer diameter of the bit whereby a greater amount of work can be accomplished without undue wear on the cutting edges.

Fig. 9 is a fragmentary section view on the line 9—9 of Fig. 8.

In carrying out my invention as herein embodied, particular reference being had to Figs. 1 to 6 inclusive, 10 represents the shank provided with a polygonal outer end 11 for insertion in the chuck of a jack hammer or other drill operating mechanism, an intermediate collar 12 for coaction with a retainer on the hammer and a socket 13 at its inner end provided with left hand threads 14. A longitudinal passageway 15 extends through the shank from its extreme outer end to the base of the socket and is generally used as a conduit for fluid for removing chips or other debris from a hole being drilled.

The reference numeral 16 denotes a drill rod of any desirable length and in actual practice a number of these may be provided in various lengths. The drill rod may be made from bar stock having left hand threads 17 and 18 formed on opposite ends whereby said ends are interchangeable for use in connection with a drill shank or bit. Where the rod is made from bar stock, a central longitudinal hole or bore 19 is formed therein and each end of said rod is square or flat for a purpose to be presently described. I have found it very desirable to use round hollow drill rods in desired lengths made from standard steels as supplied by various manufacturers and to thread both ends thereof by means of machine or hand operated die stocks. This provides for cheap, quick field repairs without the necessity of forging, thereby eliminating strains incidental to forging. The use of rods formed in this manner also reduces the possibility of the rod being overheated and creating grain growth.

The drill bit 20 is made from a low carbon alloy steel because it is cheaper to forge, machine and anneal and any strains set up by forging or machining does not interfere with the hardening process. Said drill bit may be of any desired form, but for conveniences of illustration in Figs. 1 to 6 inclusive, I have shown the bit as having four cutting edges 21 at the outer end of the body 22 in the inner end of which is formed an internally threaded socket 23 having a flat or square face 24 at the base thereof. The threads in said socket are left handed in order to receive one of the threaded ends of the rod 16. A diagonal hole 25 extends from the base of the socket through the body to an exterior surface of the bit, particularly at the root between two adjacent cutting edges or elements 21.

The preferred method of producing a drill bit of this kind is to cut slugs of proper length, externally machined and bored internally, from a bar in an automatic bar stock machine which has from four to six working positions and to rotate the work from one tool to another. These partially completed slugs are fed into the hopper of a gear generating machine which, with the properly formed cutting tools and automatic chucks with indexing heads, holds a slug against the tool so that the metal at definite points will be removed and leave the desired cutting edges 21. In other words, the cutting edges are formed in a manner similar to the manufacture of ordinary gears and during the final cutting operations will produce flutes 26 having a sharp increase in depth adjacent the roots between contiguous cutting edges as shown at 27.

After the cutting edges have been formed the socket is threaded by the use of an internal milling machine or hobs and the clearance angle is established by automatically indexed chucks and end mills. The chamfer 28 on the inner or socket end of the bit is cut during the cut off operation in the automatic bar stock machine. This chamfer makes it easier to remove the bit from the bored hole than where a square shoulder is left on the bit because such square shoulder tends to ream a dirty hole and a taper would act as a wedge and cause the bit to stick.

In order to produce a rock drill bit with hard, wear resisting cutting edges and gauge clearance angles combined in one piece with a socket section of tough shock resisting qualities, I carburize and case harden the bit in a differential manner. This differential hardness is arranged so that the socket portion of the bit is of one degree of hardness, while the cutting edges are of a greater degree of hardness and the intermediate part of the bit is a blend between the two different extreme degrees of hardness.

To harden the bit to the proper degree to cut rock and resist the abrasive wear, the machined bits may be packed in pots with a mixture of hardening compound composed of coke, carbonate and a binder. The pots are then sealed and heated to a temperature that releases the gas in the compound and the heat is maintained at the necessary temperature for a sufficient length of time to allow the penetration of the excess carbon to a sufficient depth to assure the desired results. The bits are then quenched in water but are not ready for use since the grain size of the steel is too large. The bits are then reheated to the critical point for the carbon content of the case and requenched. This gives a maximum hardness but the structure is brittle, therefore the bits are then drawn in either air or oil for a sufficient length of time to allow the heat to penetrate the bits. The amount of heat is determined by the resultant hardness after the draw and varies according to the size of the piece.

Another method of carburizing is to place the bits in an air tight revolving tumbler which is heated externally and to then introduce a stream of gas with the proper chemical analysis into the heated chamber. This gas replaces the compound previously referred to. The reheating after the carburizing cycle may be either in an electric furnace, a gas furnace or in a liquid bath. The resultant structure from the above described heat treatment is an externally hard, wear resisting case of the desired depth with a high carbon content which gradually shades down in carbon content from the case to the original carbon content of the steel used.

The differential hardness can be secured by copper plating the threaded socket section before carburizing, and to further reduce the hardness the cutting edges are submerged in running water and the threaded section exposed to jets of flame which heat up the exposed section while the entire bit is conveyed passed the flame.

This differential hardness can also be obtained by submerging the threaded socket section in a salt or lead bath until the submerged section has attained the proper degree of temperature and then allowing the threaded section to cool in the air with the cutting edge submerged in running water to keep the heat from withdrawing some of the imparted hardness secured by the original heat treatment.

The same results can also be secured by protecting the threaded section with a cap or plug of heat resisting metal, such as nichrome, during the quenching cycle. This cap retards the cooling action of the cooling medium and prevents the protected section from securing the high degree of hardness given the unprotected cutting edges.

The heat treatment forms a hardened case 28, Fig. 5, about the drill bit with the greatest degree of hardness at the cutters or cutting edges and a less degree of hardness intermediate the ends of the bit and a still less degree of hardness at the socket end. Expressed in numbers of the Rockwell C scale, the cutters are approximately 65, the intermediate or body part is approximately 50 and the socket is approximately 30. This combination of several degrees of hardness must be secured by a blending of the two extreme degrees of hardness without a sharp line of delineation and is accomplished by any of the several methods disclosed. The intermediate degree of hardness is not brittle and will not batter under the work imposed.

The rod has several degrees of hardness, the ends being equal to approximately 47 and the center equal to approximately 45 in the Rockwell C scale. The shank is harder than the rod and both ends are equal to approximately 50 in said scale.

The difference between the degrees of hardness at the threads or ends of the rod 16 at the threads or socket of the bit 20 puts the burden on the socket threads but since the threads in the socket run all the way to the base of said socket and since the threads on the rod 16 are long enough to permit the rod to seat on the base of the socket, the threads only act to secure the bit to the rod and do not transmit any of the power waves.

The threads used are preferably a modified "Acme" type with an included 78 degree angle on both male and female parts allowing the use of number one or loose tolerances as shown and described by the United States Bureau of Standards on threads. The square metal to metal contact between an end of the rod and the base of the socket in the bit, as shown in Fig. 4, without change in cross section nor reduction in area, gives the seat which the coacting sides of the threads hold in place.

The wide threads of coarse pitch with shallow depths give ample strength under loose tolerances, as the fit depends on side contacts rather than on depth contact at the crown or root of the threads. Any thread wear or distortion is absorbed in the soft socket section of the bit and as this is discarded with the bit when the latter becomes dull, no thread wear takes place on the drill rod.

At present it is the general practice to form the fluid conduit hole through the bit in the axis of the drill rod. Exceptions to this are those which are made without any hole and let the fluid enter the boring behind the bit proper. In the latter structure, there are always some cuttings at the bottom of the boring which are pulverized instead of being blown out as chips.

The hole directly through the bit in all other types gives an uninterrupted flow of air to the cutting face but has the disadvantage of becoming easily plugged when the drill is dropped into a boring which has an accumulation of cuttings that may be moist or when mud seams are encountered.

The oblique or diagonal hole 25 which I form in the drill bit is practically non-clogging and is drilled at the proper angle between the cutting edges through the body to the base of the socket for registration with the hole through the rod.

The rotation of the bit with the air entering the boring at an angle will more effectively agitate the cuttings and facilitates their removal at the face of contact of the bit with the rock. A drill having this side hole feature dropped into a dirty boring is less likely to become plugged as the entry angle is protected by its location in a flue between adjacent wings.

The drilling of rock is primarily the action of a wedge, penetrating in ratio to the brittleness of the rock and the blow delivered by the hammer. The use of air driven hammer type drills with rotation of the steel introduces the factor of wear on the outer edges of the bit and this wear is commonly termed gauge wear. Various schemes have been tried to reduce this gauge wear and the best method has been to provide wide wings or supports for the cutting edges with the lower edges of the two sides extending to a point which measured with the diametrically opposite corner and is the same dimension as the diameter of the cutting edges. The two sides of the cutting edge supports are connected by an arcuate angle thus giving three points of contact with the hole being drilled and two reaming edges. These reaming edges resist wear and take a certain burden from the extreme outer edges of the cutting edges.

As shown in Fig. 7, the conventional type of rock drill bit has four cutting edges. This bit has several variations but the different designs are all based on the possibility of being able to forge such shapes and resharpen when dull by reforging or grinding the worn portions. The four cutting edges drill a round hole and the eight reaming edges in contact with the periphery of the hole being drilled, with the twelve points of contact, assist the cutting edges in cutting the rock.

Theoretically, the proper design of bits would be to have an increasing number of cutting edges in the direct ratio to the diameter of the hole. However, these are impractical to manufacture and impossible to reform when dull either by forging or grinding.

The use of a carburizing steel in the manufacture of a detachable rock drill bit with the "throw-away when dull" feature allows the use of any desired form of cutting edges, which are formed by cutting tools, such as millers, etc.

Fig. 8 shows the proposed design of bit with extra cutting edges provided around the outer edge of the bit and these cutting edges are in a close ratio to the amount of rock to be removed.

The extremities of one pair of cutting edges are connected by one arcuate angle giving four points of contact with the periphery for each cutting member with correspondingly wider base for the member and larger clearances between the wings proper, which allows the air coming through the hollow drill rod and the hole in the center of the bit to remove the cuttings from the working point.

In this form, 29 denotes a number of cutting edges radiating for the center of the bit 30 to points short of the circumference of said bit and from each of these points diverge a pair of branching cutting edges 31. In effect the outer end of each main cutting edge is bifurcated so as to double the effective cutting edges at or near the circumference of the bit. The fluid passageway or hole 32 may be located directly in the axis of the bit, as shown, or otherwise.

Figs. 7 and 8 both include equally spaced concentric circles of dotted or broken lines and the spaces between such circles represent certain definite areas and are lettered for ready reference thereto.

The area of the spaces or sections A, B, C, D and E are assumed to be .1473 square inch, .2454 square inch, .3436 square inch, .4418 square inch, and .5399 square inch, respectively and therefore the ratio of work that the sections of the cutting edges traveling around space A have to do relative to the work which similar sections of the cutting edges traveling around space B is 3 as to 5. The ratio between spaces B and C is 5 as to 7, while that between C and D is 7 to 9, and the ratio between D and E is 9 to 11.

With the same premises, the ratio of work done by the sections of the cutting edges operating in spaces F and G will remain 3 to 5 but since there are twice the number of cutting edge sections operating in the remaining spaces the ratio between spaces G and H will be 5 as to 6 and between spaces H and I it will be 6 as to 7 and between spaces I and J it will be 7 as to 8.

From this it will be obvious that the life of the bit will be greatly increased and the upkeep considerably decreased.

While I have particularly stressed the manufacture of removable one-piece drill bits from bar stock, I recognize they can be made as forgings and castings from low carbon alloy steel and when properly heat treated will be effective and therefore I have no intention of limiting myself to the use of bar stock.

To produce a bit of this kind by forging the steel is forced into the wings of the die by a punch on the ram which punch forms the socket. The operation may be said to be inverted and the flash instead of being formed on the cutters, as is usual, is formed on the end of the socket from which location it may be readily removed without affecting the cutters.

The bits may also be formed by casting the desired metal in the wanted size and shape. The castings may be made from steel of proper analysis to take the necessary heat treatment or they may be made from malleable iron if treated as described in United States patents, Numbers 1,574,374; 1,574,375; 1,574,376; and 1,574,377 to give the desired hardness.

Of course I do not wish to be limited to the exact details of construction herein shown and described as these may be varied within the limits of the appended claims without departing from the spirit of my invention.

Having thus fully described my invention, what I claim as new and useful is:—

1. A drill bit having a series of radiating cutting edges disposed at an angle to one another, said radiating cutting edges being continuous with outwardly diverging straight cutting edges at their outer ends.

2. A drill bit having intersecting straight cutting edges disposed at an angle to one another, said radiating cutting edges being continuous with straight forked cutting edges at their outer ends.

3. A drill bit having a series of continuous Y-shaped cutting edges radiating from the center of the bit and disposed at an angle of less than 180° with respect to each other, the forks of said cutting edge being at the outer ends thereof.

4. A drill bit having three cutting edges radiating from the center of the bit and each terminating in V-shaped cutting edges.

5. A drill bit having three cutting edges radiating from the center of the bit and disposed equiangularly with respect to each other, each of said cutting edges terminating in V-shaped cutting edges.

WALTER C. REA.